Patented Apr. 7, 1942

2,278,872

UNITED STATES PATENT OFFICE 2,278,872

PIGMENT FOR COLORING CERAMIC COMPOSITIONS

Charles G. Geary, Perth Amboy, N. J., assignor to E. I. du Pont de Nemours & Company, Wilmington, Del., a corporation of Delaware No Drawing. Application August 1, 1940, Serial No. 349,246

19 Claims. (Cl. 106—292)

This invention relates to improved ceramic pigments which are particularly valuable for coloring ceramic compositions, and to a new and improved method by which such pigments may be produced. More particularly, it relates to ceramic pigments containing compounds of chromium and antimony which are especially useful for imparting to ceramic compositions colors in the yellow to brown hue range.

It has always been difficult to secure pigments suitable for coloring ceramic compositions for the reason that such pigments are subjected to especially severe conditions of use. In coloring ceramic compositions the ceramic pigment is ordinarily exposed to high temperatures and to the corrosive action of vitrifiable materials. Under these circumstances but few pigment compositions which are suitable for general usage have given satisfactory results when utilized for coloring ceramic compositions such as glazes and enamels.

The particular ceramic pigments with which this invention is concerned are designed to be useful in imparting colors falling in the yellow to brown range. These pigments, as distinguished from the ordinary pigments containing compounds of chromium and antimony, are of a stability sufficiently high to permit their use as stains mixed with clay bodies in which they are fired at temperatures as high as 1400° C.

It is therefore an object of this invention to develop ceramic pigments containing chromium and antimony which are suitable for use in coloring ceramic compositions in the yellow to brown hue range. Another object of this invention is the development of ceramic pigments of stability sufficiently high to permit their use as stains in which they are mixed with clay bodies and fired at relatively high temperatures.

A further object of this invention involves the preparation of generally usable ceramic pigments which are suitable for use in coloring vitreous enamels, low-fire vitrifiable ceramic colors, or in other ceramic applications. This object involves the ancillary object of securing pigmentary compositions which will be stable in color when utilized under various conditions of firing.

Still another object of this invention is the development of ceramic pigments having a hue falling within the yellow to brown range which pigments will be uniform and which will be readily reproducible as standard articles of manufacture. Still another object involves the development of pigments which will be free from objectionable inhomogeneities and off-shade areas within the pots in which the pigments are prepared by calcination. By eliminating such variations in color it is possible to dispense with the necessity for grading the material and rejecting unsatisfactory portions of the calcines, which procedure must be applied to the pigment compositions now known to the art which are substantially non-homogeneous in shade, thus resulting in substantially increased expense in the process of manufacture.

Mixtures containing compounds of antimony and chromium have been previously subjected to calcination and have been found to yield pigments which are suitable for use in the coloring of ceramic compositions. However, such compositions have been generally subject to non-uniformity in the calcined product, which non-uniformity is usually apparent from the formation of darker, hard cores in the center of the kiln pots. In present practice, when the kiln pots are filled with the mixture of antimony and chromium compounds and subjected to firing at the high temperatures necessary for the development of such pigments, the resulting calcine has been generally non-homogeneous in character and has contained cores of darker shade. It is the principal object of this invention to eliminate these core-forming tendencies, thereby greatly improving the resulting pigment. As the result, such pigments are more easily reproducible as standard articles, a factor which is of considerable value in the commercial manufacture of ceramic pigments.

From my study of the reactions involved when mixtures of compounds of chromium and antimony yielding chromium oxide and antimony oxide under the conditions of the reaction are subjected to calcination, I have found that they react at comparatively low temperatures to form a sintered black mass similar to the cores found when mixtures containing these two components are subjected to calcination under other conditions. If an antimony oxide of higher valence is employed, such as antimony pentoxide, the temperature must be raised to nearly 1000° C. before any non-uniformity in the calcine is observed. When chromium oxides of higher valence are employed, however, the prevention of the formation of a non-homogeneous product is not equally successful. When mixtures of chromic acid anhydride and antimony trioxide are calcined together it is observed that cores are formed at temperatures ranging from 600 to 700° C., depending on the ratio of the chromium compound to antimony compound in the calcine mix. If sodium antimonate is used in place of antimony oxide, the non-uniformity of the resulting calcined product is less pronounced and the resulting cores are softer, but there is still a marked difference between the inside portions and outside portions of the calcines, a difference sufficient to prevent the successful use of such compositions in pigment manufacture.

The problem of obtaining uniformity in calcined pigments containing the oxides of chromium and antimony has been previously made the subject of study by ceramic specialists. In one case, as illustrated by the Harbert Patent 1,945,809, it has been possible to secure improved pigments containing not only antimony and chromium but also titanium, by introducing into the mixture subjected to calcination the oxide of an electropositive element. Such pigments, containing titanium dioxide in addition to oxides of chromium and antimony, constitute in effect one special example of the broad group of pigments which may be defined as the calcined pigments containing the oxides of chromium and antimony.

In the Long Patent 1,954,390 pigments prepared by calcining titanium dioxide and an antimony compound are improved by having or producing in place the antimony component in the pentavalent state in combination with a base. Such pigments normally contain a base such as an alkali metal base, and care is taken to insure the presence in the calcine of the antimony in its higher valence.

While such pigments indicate the possibility of improving special types of pigments containing antimony so as to render the products more suitable for use in decorating ceramic compositions such as glazes or vitreous enamels, it is evident that these solutions of the problem are not of general application, nor will they result in improved pigment compositions except under special circumstances and with certain specific types of pigments. The problem of obtaining uniformity in calcined pigments containing the oxides of chromium and antimony has been solved only for certain specific compositions. I have now found that all calcined pigments containing the oxides of chromium and antimony can be greatly improved and rendered more homogeneous and uniform in character by the utilization of certain additional ingredients in the calcine composition. Not only is it possible to improve ceramic pigments generally containing the oxides of chromium and antimony by the use of my discovery, but it is also possible to improve the specific types of pigment compositions described in the Harbert and Long patents over similar compositions not prepared in accordance with my invention.

It has now been discovered that ceramic pigment compositions of the type noted are greatly improved by including sulfates in the mixtures containing chromium and antimony oxides. The sulfates may be included with or without the oxides of other elements, and produce a surprising elimination of core formation. When the mixtures containing sulfates are subjected to calcination there result pigment compositions of substantially uniform color throughout the entire crucible or kiln pot, in which the calcined product is prepared. The necessary amount of sulfate may be added by mixing chromic oxide and antimony oxide, together with the other ingredients comprising the pigment composition, with sulfuric acid previous to calcination. Other means of introducing the necessary sulfate to the mixture involve the use of chromium sulfate, of antimony sulfate, or, where the presence of additional elements is not objectionable or is desired, one or more of these elements may be added in the form of the sulfate. The presence of the sulfate radical or of a sulfate during the calcining operation appears to bring about the desired improvement, although the exact way in which this is accomplished is not fully understood.

The quantity of sulfate needed to bring about a distinct improvement in the character of the resulting pigment will vary somewhat with the nature of the composition. In general, approximately one mole of sulfate per mole of antimony oxide present will be found to give very satisfactory results. However, this quantity is not critical, and considerable benefit is obtained even from the use of very much smaller quantities of sulfate. The effect of sulfates in improving the ceramic pigment, as far as I can determine, is a broad general application, the sulfate bringing about a valuable degree in improvement of uniformity in all pigment systems containing the elements chromium and antimony.

The pigments which may be improved by introduction of sulfates may thus be the usual products obtained by calcining mixtures of chromium and antimony oxides or mixtures of compounds of these metals yielding the oxides during the calcination. However, I have also found that sulfates, when present, also improve pigments prepared by calcining mixtures in which an electropositive element is present, such as those described in the previously referred to Harbert patent. The homogeneity and uniformity of pigments containing such an electropositive element are still further improved by having a sulfate present in compositions of this type in addition to the electropositive element. In other words, the basic improvement in quality of pigments secured by the introduction of sulfates into any composition containing the oxides of chromium and antimony is secured, regardless of whether the pigments are improved pigments such as those of Harbert or Long, or unimproved pigments such as those secured by the simple calcination of a mixture containing the oxides of chromium and antimony. It may be here remarked that pigment compositions falling outside the composition ranges given in the Harbert and Long patents and not containing an electropositive element, which compositions have previously been wholly without value for use in coloring ceramic compositions, can be improved in uniformity to such an extent as to render them of high quality by introducing into such pigment compositions a sulfate in accordance with my invention.

When pigments are prepared without the addition thereto of an electropositive element, I have found that such pigments are much stronger and better for some purposes, such as for use in coloring vitreous enamels, than are similar pigments containing, in addition, an electropositive element. The omission of the electropositive element does, however, increase the tendency of the system to form cores on calcination, which cores may differ in color and hardness from the main body of the material. Formation of such cores has in the past tended to restrict the large-scale production of desirable pigments from compositions containing, for example, only compounds of chromium, antimony, and titanium. While the introduction of sulfates into such compositions containing no electropositive element renders them much more homogeneous and uniform in character, I also prefer under certain circumstances to have an electropositive element present in order that the maximum effect in reducing the tendency of the systems to form cores on calcination may be secured.

By adding sulfuric acid to a batch containing chromic acid anhydride, antimony oxide and titanium dioxide, it is possible to eliminate the necessity for introducing base-forming elements so that substantially uniform calcines may be obtained from compositions which, without the presence of the sulfate, would give marked core formation. This is particularly true with compositions containing chromium oxide, antimony oxide, and titanium dioxide, which if calcined at relatively high temperatures without the presence of sulfates, would give hard, sintered cores of no pigmentary value. When sulfuric acid or other sulfate is present, the resulting calcines are soft and uniform throughout, and the production of hard, sintered cores is substantially completely avoided. For this reason pigments obtained from the system chromium-antimony-titanium, containing no added electropositive element but containing sulfuric acid or other sulfate are, because of their inherent strength and stability, particularly suitable for use in coloring vitreous enamels, especially those acid-resistant enamels intended for application to sheet steel.

Where the use of an electropositive element is desirable, in accordance with my invention such element can most advantageously be added in the form of its sulfate. Most of such sulfates are well-defined crystalline salts which may be readily mixed with the other ingredients comprising the pigment which are subjected to calcination. Where sodium is desired, or where the presence of sodium is not objectionable, it will be found most advantageous in general to add the antimony in the form of sodium antimonate. Where further quantities of alkali are required, the alkali may be added in other forms, such for example as in the form of potassium chrome alum.

I have discovered that a particularly desirable pigment of buff color may be obtained by the use of calcium sulfate in combination with sodium antimonate, chromic acid anhydride, and titanium dioxide. Where yellower shades are desired, the calcium sulfate may be replaced by barium sulfate, beryllium sulfate, or manganese sulfate, with no sacrifice in the uniformity of the resulting calcine. The chromium may be present in either the form of chromic acid anhydride or chromic oxide. The temperature employed for the calcination will vary with the particular compositions involved and the shades desired, but generally will exceed 1000° C.

It is possible to secure calcines of uniform character having properties rendering them suitable for use as ceramic pigments by employing titanium in other forms. For example, rutile (titanium dioxide mineral) may be employed in conjunction with sodium antimonate and potassium chrome alum, or titanium sulfate cake may be utilized in conjunction with titanium dioxide, antimony oxide, and chromic acid anhydride.

It is possible to secure further modification in the shade of the pigment resulting by calcination of the system chrome-antimony-titanium by having present therein other sulfates such as those of ferrous and ferric iron, magnesium, zinc, copper, nickel, lead, and aluminum. The use of alkali metal sulfates will usually be found less desirable than substitution of sodium antimonate for all or part of the antimony oxide present in a given composition.

The "foundation systems" which result in ceramic pigments of improved character by the inclusion therein of a sulfate include the following:

(a) Products prepared by calcining a mixture comprising compounds of chromium and antimony.

(b) Pigments resulting from the calcination of a mixture comprising compounds of chromium, antimony and titanium.

(c) Pigments resulting from the calcination of a mixture comprising compounds of chromium, antimony, titanium, and an element electropositive to these.

(d) Pigments prepared by calcining a mixture comprising an oxygen-containing compound of chromium, an oxygen-containing compound of titanium, and sodium antimonate.

In every case the compounds of chromium, antimony and titanium (where the latter is present) are either the oxides of these metals, or compounds which on heating yield the oxides.

The necessary amount of sulfate may be added to any one of these "foundation systems" in any one of the following ways:

(a) The sulfate may be added by having any or all of the primary components, i. e. compounds of chromium, antimony or titanium, present in the form of their respective sulfates.

(b) Sulfuric acid may be added to any of these basic systems or other mixture comprising compounds of chromium and antimony, with or without other additions.

(c) The sulfate may be added in the form of one or more of the sulfates of calcium, barium, beryllium, or manganese. In this case the calcium, barium, beryllium or manganese constitutes one or more electropositive elements. This group of metals may be regarded as the preferred group, although those of group $d$ below may also be utilized.

(d) The sulfate may also be added in the form of the sulfate of some other metal such as the sulfates of ferrous or ferric iron, magnesium, zinc, copper, nickel, lead, and/or aluminum. These metals will also constitute electropositive elements when present in the mixture subjected to calcination, and in addition to their effect in so far as insuring the presence of a sulfate is concerned, will also yield pigments of various modified shades.

It may here be remarked that where the sulfate is added in the form of a metallic sulfate of some additional ingredient, it is preferred to employ either calcium sulfate or beryllium sulfate or mixtures of these sulfates.

The following are examples of compositions which when subjected to calcination result in the improved pigments of my invention. Some of these compositions are similar to those disclosed in the previously referred to Harbert patent, except that they include the additional sulfate. Other compositions, on the other hand, are entirely new and are in no respects similar to any previous teachings or disclosures in the ceramic pigment art.

Illustrative mixtures which when subjected to calcination will result in my improved pigments are tabulated below. In each case all parts are by weight.

Example 1

15 parts of chromic oxide $Cr_2O_3$, 58 parts antimony trioxide $Sb_2O_3$, 25 parts of water, and 46 parts of concentrated sulfuric acid.

Example 2

58 parts of antimony trioxide $Sb_2O_3$, and 48 parts chromic sulfate $Cr_2(SO_4)_3.5H_2O$.

Example 3

15 parts of chromic oxide $Cr_2O_3$, 29 parts of antimony trioxide $Sb_2O_3$, and 53 parts of antimony sulfate $Sb_2(SO_4)_3$.

Example 4

15 parts of chromic oxide $Cr_2O_3$, 71 parts of sodium antimonate $NaSbO_3$, 12.5 parts of water, and 23 parts of concentrated sulfuric acid.

Example 5

30 parts of chromic oxide $Cr_2O_3$, 71 parts of sodium antimonate $NaSbO_3$, 25 parts of water, and 46 parts of concentrated sulfuric acid.

Example 6

15 parts of chromic oxide $Cr_2O_3$, 71 parts of sodium antimonate $NaSbO_3$, and 48 parts of chromic sulfate $Cr_2(SO_4)_3.5H_2O$.

Example 7

71 parts of sodium antimonate $NaSbO_3$, and 48 parts of chromic sulfate $Cr_2(SO_4)_3.5H_2O$.

Example 8

18 parts of chromic acid anhydride $CrO_3$, 27 parts of antimony trioxide $Sb_2O_3$, 55 parts of titanium dioxide $TiO_2$, 80 parts of water and 18.4 parts of concentrated sulfuric acid.

Example 9

12 parts of chromic oxide $Cr_2O_3$, 20 parts of antimony trioxide $Sb_2O_3$, 68 parts of titanium dioxide $TiO_2$, 90 parts of water and 18.4 parts of concentrated sulfuric acid.

Example 10

10 parts of chromic acid anhydride $CrO_3$, 30 parts sodium antimonate $NaSbO_3$, 60 parts titanium dioxide $TiO_2$, and 18.4 parts of concentrated sulfuric acid.

Example 11

10 parts of chromic acid anhydride $CrO_3$, 20 parts of sodium antimonate $NaSbO_3$, 50 parts of titanium dioxide $TiO_2$, and 20 parts of plaster of Paris $2CaSO_4.H_2O$.

Example 12

10 parts of chromic oxide $Cr_2O_3$, 20 parts of sodium antimonate $NaSbO_3$, 50 parts of titanium dioxide $TiO_2$, and 20 parts of barium sulfate $BaSO_4$.

Example 13

10 parts of chromic oxide $Cr_2O_3$, 20 parts of antimony trioxide $Sb_2O_3$, 50 parts of titanium dioxide $TiO_2$, and 20 parts of barium sulfate $BaSO_4$.

Example 14

5 parts of chromic acid anhydride $CrO_3$, 10 parts of sodium antimonate $NaSbO_3$, 75 parts of titanium dioxide $TiO_2$, and 10 parts of beryllium sulfate $BeSO_4.4H_2O$.

Example 15

4 parts of chromic oxide $Cr_2O_3$, 10 parts of sodium antimonate $NaSbO_3$, 76 parts of titanium dioxide $TiO_2$, and 10 parts of beryllium sulfate $BeSO_4.4H_2O$.

Example 16

5 parts of chromic acid anhydride $CrO_3$, 10 parts of sodium antimonate $NaSbO_3$, 75 parts of titanium dioxide $TiO_2$, and 10 parts of manganese sulfate $MnSO_4.4H_2O$.

Example 17

20 parts of sodium antimonate $NaSbO_3$, 60 parts of rutile, 20 parts of potassium chrome alum $K_2SO_4.Cr_2(SO_4)_3.24H_2O$.

Example 18

18 parts of chromic acid anhydride $CrO_3$, 27 parts of antimony trioxide $Sb_2O_3$, 25 parts of titanium dioxide $TiO_2$, and 30 parts of titanium sulfate cake.

Example 19

20 parts of chromic oxide $Cr_2O_3$, 40 parts of sodium antimonate $NaSbO_3$, 100 parts of titanium dioxide $TiO_2$, and 40 parts of ferrous sulfate $FeSO_4.7H_2O$.

Example 20

20 parts of chromic oxide $Cr_2O_3$, 40 parts of sodium antimonate $NaSbO_3$, 100 parts of titanium dioxide $TiO_2$, and 40 parts of ferric sulfate $Fe_2(SO_4)_3$.

Example 21

10 parts of chromic acid anhydride $CrO_3$, 20 parts of sodium antimonate $NaSbO_3$, 50 parts of titanium dioxide $TiO_2$, and 20 parts of magnesium sulfate $MgSO_4.7H_2O$.

Example 22

10 parts of chromic acid anhydride $CrO_3$, 20 parts of sodium antimonate $NaSbO_3$, 50 parts of titanium dioxide $TiO_2$, and 20 parts of zinc sulfate $ZnSO_4.7H_2O$.

Example 23

5 parts of chromic oxide $Cr_2O_3$, 20 parts of sodium antimonate $NaSbO_3$, 70 parts of titanium dioxide $TiO_2$, and 5 parts of lead sulfate $PbSO_4$.

Example 24

20 parts of chromic oxide $Cr_2O_3$, 40 parts of sodium antimonate $NaSbO_3$, 100 parts of titanium dioxide $TiO_2$, and 40 parts of nickel sulfate $NiSO_4.7H_2O$.

Example 25

5 parts of chromic oxide $Cr_2O_3$, 20 parts of sodium antimonate $NaSbO_3$, 65 parts of titanium dioxide $TiO_2$, and 10 parts of potassium acid sulfate $KHSO_4$.

Example 26

20 parts of antimony trioxide $Sb_2O_3$, 38 parts of titanium dioxide $TiO_2$, 32 parts of chromic sulfate $Cr_2(SO_4)_3.5H_2O$, and 10 parts of beryllium sulfate $BeSO_4.4H_2O$.

Example 27

30 parts of sodium antimonate $NaSbO_3$, 40 parts of titanium dioxide $TiO_2$, and 30 parts of chromic sulfate $Cr_2(SO_4)_3.5H_2O$.

Example 28

12 parts of chromic acid anhydride $CrO_3$, 51 parts of antimony sulfate $Sb_2(SO_4)_3$, 60 parts titanium dioxide TiO₂, 9.6 parts of sodium hydroxide NaOH, and 20 parts of water.

In each case the compositions were thoroughly comminuted and mixed and fired at a high temperature, a temperature generally over 1000° C., in order that maximum color and stability might be developed. In each case the particular temperature selected depended on the particular composition being fired. Where sulfuric acid is included in the batch, it is advantageous to wet mill the entire mixture, after which the slurry is dried, crushed, and placed in the kiln pots. After firing, the calcines were in each case milled and washed free of soluble chromium. The resulting pigments exhibit high stability to heat and to chemical attack, and are particularly desirable for use in coloring ceramic compositions.

Since the foregoing compositions are designed to be illustrative and not restrictive, it should be remembered that other modes of applying the principles of this invention may be utilized. The invention is not to be restricted to specific features or details, given as illustrative and not as limiting, except insofar as such restriction is in accordance with the appended claims and prior art.

I claim:

1. A process of preparing a ceramic pigment which comprises calcining a base mixture including compounds of chromium and antimony in the presence of a sulfate.

2. A process of preparing a ceramic pigment which comprises calcining a base mixture including compounds of chromium, antimony and titanium in the presence of a sulfate.

3. A process of preparing a ceramic pigment which comprises calcining a base mixture including compounds of chromium, antimony, titanium, and an element electropositive to said metals in the presence of a sulfate.

4. A process of preparing a ceramic pigment which comprises calcining a base mixture including an oxygen-containing compound of chromium, an oxygen-containing compound of titanium, and sodium antimonate in the presence of a sulfate.

5. A process of preparing a ceramic pigment which comprises calcining a mixture including compounds of chromium and antimony in the presence of sulfuric acid.

6. A process of preparing a ceramic pigment which comprises calcining a mixture including compounds of chromium, antimony, and titanium in the presence of sulfuric acid.

7. A process of preparing a ceramic pigment which comprises calcining a mixture including compounds of chromium, antimony, titanium, and an element electropositive to said metals in the presence of sulfuric acid.

8. A process of preparing a ceramic pigment which comprises calcining a mixture including compounds of chromium and antimony in the presence of a metallic sulfate selected from the group which consists of the sulfates of the following metals: calcium, barium, beryllium, manganese, iron, magnesium, zinc, copper, nickel, lead and aluminum.

9. A process for preparing a ceramic pigment which comprises calcining a mixture including compounds of chromium, antimony and titanium, said mixture also including a metallic sulfate selected from the group which consists of the sulfates of the following metals: calcium, barium, beryllium, manganese, iron, magnesium, zinc, copper, nickel, lead and and aluminum.

10. A process for preparing a ceramic pigment which comprises calcining a mixture including compounds of chromium, antimony, titanium and an element electropositive to said metals, said mixture also including a metallic sulfate selected from the group which consists of the sulfates of the following metals: calcium, barium, beryllium, manganese, iron, magnesium, zinc, copper, nickel, lead, and aluminum.

11. A process of preparing a ceramic pigment which comprises calcining a mixture including compounds of chromium and antimony in the presence of calcium sulfate.

12. A process of preparing a ceramic pigment which comprises calcining a mixture including compounds of chromium and antimony in the presence of beryllium sulfate.

13. A ceramic pigment prepared by calcining a base mixture including compounds of chromium and antimony in the presence of a sulfate.

14. A ceramic pigment which comprises the product prepared by calcining a base mixture including compounds of chromium and antimony in the presence of sulfuric acid.

15. An improved ceramic pigment which comprises the product prepared by calcining a base mixture including compounds of chromium and antimony in the presence of a metallic sulfate selected from the group which consists of the sulfates of the following metals: calcium, barium, beryllium, manganese, iron, magnesium, zinc, copper, nickel, lead and aluminum.

16. An improved ceramic pigment which comprises the product prepared by calcining a base mixture including compounds of chromium, antimony and titanium in the presence of a sulfate.

17. An improved ceramic pigment which comprises the product prepared by calcining a base mixture including compounds of chromium, antimony, titanium, and an element electropositive to said metals in the presence of a sulfate.

18. An improved ceramic pigment which comprises the product prepared by calcining a base mixture including an oxygen-containing compound of chromium, an oxygen-containing compound of titanium, and sodium antimonate in the presence of a sulfate.

19. An improved ceramic pigment which comprises the product prepared by calcining a base mixture including compounds of chromium, antimony, titanium, and an element electropositive to said metals in the presence of a metallic sulfate selected from the group which consists of the sulfates of the following metals: calcium, barium, beryllium, manganese, iron, magnesium, zinc, copper, nickel, lead and aluminum.

CHARLES G. GEARY.